United States Patent [19]

Nogami et al.

[11] 4,102,551
[45] Jul. 25, 1978

[54] FLUID PRESSURE CONTROL VALVE FOR VEHICLE BRAKING SYSTEMS

[75] Inventors: Tomoyuki Nogami, Toyota; Takaaki Ohta, Okazaki, both of Japan

[73] Assignee: Toyota Jidosha Kogyo Kabushiki Kaisha, Toyota, Japan

[21] Appl. No.: 800,860

[22] Filed: May 26, 1977

[30] Foreign Application Priority Data

Jun. 5, 1976 [JP] Japan .................. 51-65980

[51] Int. Cl.$^2$ .................. B60T 8/14
[52] U.S. Cl. .................. 303/24 A; 303/6 C; 303/22 R
[58] Field of Search .................. 303/6 C, 22 R, 24 A, 303/24 C, 24 F, 24 R

[56] References Cited

U.S. PATENT DOCUMENTS

| | | | |
|---|---|---|---|
| 3,317,251 | 5/1967 | Hambling et al. | 303/24 A |
| 3,385,308 | 5/1968 | Farr | 303/24 C X |
| 3,489,465 | 1/1970 | Bueler | 303/24 C |
| 3,727,990 | 4/1973 | Vogt | 303/24 A X |

Primary Examiner—Duane A. Reger
Attorney, Agent, or Firm—Kenyon & Kenyon

[57] ABSTRACT

An inertia-controlled valve unit comprises a differential piston slidable within a stepped bore of a housing to provide first and second fluid chambers respectively in open communication with inlet and outlet ports of the housing, the piston being exposed at the smaller end thereof in the first chamber and at the larger end thereof in the second chamber. The valve unit further comprises a tubular spool slidable within an axial bore of the piston and having one end fixedly engaged with the inner wall of the housing in the second chamber and the other end exposed in the first chamber, the spool including an axial passage permitting fluid flows between the first and second chambers, and a cut-off valve including a valve seat provided on the other end of the spool and an inertia-controlled ball located within the first chamber to co-operate with the valve seat and rolling toward the valve seat to cut-off fluid flow from the first chamber to the second chamber when the ball is subjected to a deceleration in excess of a predetermined value.

11 Claims, 3 Drawing Figures

FLUID PRESSURE CONTROL VALVE FOR VEHICLE BRAKING SYSTEMS

BACKGROUND OF THE INVENTION

The present invention relates to a fluid pressure control device for a vehicle braking system, and more particularly to an inertia-controlled valve unit for incorporation in a vehicle braking system between a master cylinder and rear wheel brake cylinders to control the braking pressure applied to the rear wheel brake cylinders from the master cylinder in accordance with the rate of deceleration of the vehicle.

SUMMARY OF THE INVENTION

The primary object of the present invention is to provide an inertia-controlled valve unit to control the braking pressure applied to the rear wheel brake cylinders in accordance with increase or decrease of the load of the vehicle in such a manner that the braking force distribution ratio between the front and rear wheel brake cylinders can be accorded with an ideal distribution ratio characteristic curve.

Another object of the present invention is to provide an inertia-controlled valve unit of which the component parts are coaxially assembled to reduce the axial length of the valve unit.

According to the present invention, there is provided an inertia-controlled valve unit for incorporation in a vehicle braking system between a master cylinder and rear wheel brake cylinders, which valve unit comprises:

a housing provided with an inlet port for connection to the master cylinder, an outlet port for connection to the rear wheel brake cylinders, and a stepped bore in communication with the inlet and outlet ports respectively at the small and large diameter portions thereof;

a differential piston slidably disposed within the stepped bore to provide first and second fluid chambers respectively in open communication with the inlet and outlet ports, the piston being provided with an axial bore therethrough and being exposed at the smaller end thereof in the first chamber and at the larger end thereof in the second chamber;

a spring for biasing the piston axially in a direction toward the second chamber;

a tubular spool member slidably disposed within the axial bore of the piston and having one end fixedly engaged with the inner wall of the housing in the second chamber and the other end exposed in the first chamber, the spool member including an axial passage permitting fluid flow between the first and second chambers; and a cut-off valve including a valve seat provided on the other end of the spool member and an inertia-controlled ball located within the first chamber to co-operate with the valve seat and rolling toward the valve seat to cut-off fluid flow from the first chamber to the second chamber when the ball is subjected to a deceleration in excess of a predetermined value.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
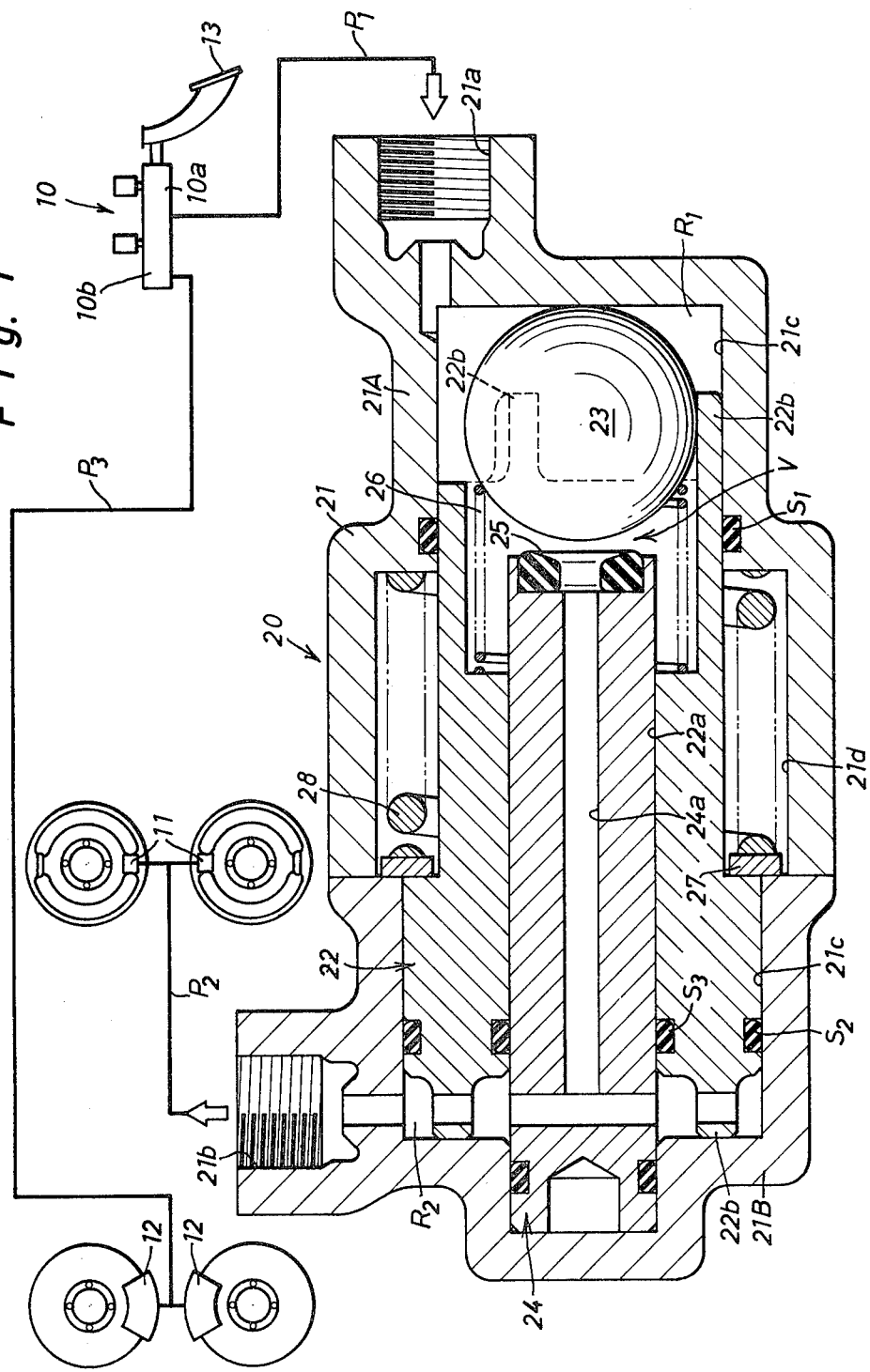
FIG. 1 is a schematic illustration of a vehicle braking system including an inertia-controlled valve unit of the present invention.

Referring now to FIG. 1 of the accompanying drawings, there is illustrated a preferred embodiment of an inertia-controlled valve unit 20 in accordance with the present invention. The control valve unit 20 is mounted on a vehicle body frame (not shown) at an inclined angle in relation to the horizontal and is incorporated between pipe lines $P_1$ and $P_2$ connecting a rear pressure chamber 10a of a tandem master cylinder 10 to rear wheel brake cylinders 11. The control valve unit 20 has a housing 21 in which a differential piston 22, an inertia-controlled ball 23 and a tubular spool member 24 are assembled. The housing 21 consists of right and left housing sections 21A and 21B, the former being provided thereon with an inlet port 21a for connection to the master cylinder 10 and the latter being provided thereon with an outlet port 21b for connection to the rear wheel brake cylinders 11. Within the housing 21, a stepped cylindrical bore 21c is communicated at its small diameter portion with the inlet port 21a and at its large diameter portion with the outlet port 21b.

The differential piston 22 is slidably disposed within the stepped cylindrical bore 21c by way of seal members $S_1$ and $S_2$ and forms a first fluid chamber $R_1$ in open communication with the inlet port 21a and a second fluid chamber $R_2$ in open communication with the outlet port 21b. The piston 22 is normally biased leftward or forward by means of a first compression spring 28, one end of which is engaged with a right inner shoulder of an annular recessed portion 21d and the other end with an outer stepped portion of the piston 22 by way of a ring-shaped retainer 27. The differential piston 22 is provided at its axial center with an axial stepped bore 22a and further provided at its left end with an annular stopper 22b which is axially extended with a predetermined dimension. Thus, the assembled construction is as such that when the stopper 22b is engaged with the inner wall of the left housing section 21B, the retainer 27 is also engaged with a left inner shoulder of the recessed portion 21d.

The tubular spool member 24 is slidably disposed within the small diameter portion of the stepped bore 22a by way of a seal member $S_3$ and securely fixed to the inner wall of the housing section 21B at the left end thereof. The spool member 24 is provided at its right end with a valve seat 25 exposed in the first chamber $R_1$ and provided at its axial center with a passage 24a connecting the first and second chambers $R_1$ and $R_2$ through the valve seat 25.

The inertia-controlled ball 23 is located in the first chamber $R_1$ and received by three receiving arms 22b extended from the piston 22 to be permitted to roll in the leftward or forward direction. The ball 23 co-operates with the valve seat 25 to provide a cut-off valve which functions to interrupt fluid communication between the first and second chambers $R_1$ and $R_2$. The ball 23 is normally biased in the rightward or rearward direction and resiliently supported in the assembled position by means of a second compression spring 26 with a predetermined loading, one end of which is engaged with an inner stepped portion of the differential piston 22. In FIG. 1, a reference numeral 13 represents a brake pedal and reference numerals 12, 12 represent front wheel brake cylinders directly connected to a front pressure chamber 10b of the master cylinder 10 by way of a pipe line $P_3$.

In operation of the inertia-controlled valve unit 20, when the brake pedal 13 is depressed under an unloaded condition of the vehicle, master cylinder pressure Pm is produced in the front and rear pressure chambers 10a and 10b of the master cylinder 10. The pressure in the front pressure chamber 10b is directly applied to the front wheel brake cylinders 12, 12 by way of the pipe line $P_3$. However, the pressure in the rear pressure chamber 10a is applied to the first chamber $R_1$ of the valve unit 20 via the pipe line $P_1$ and the inlet port 21a and subsequently applied to the second chamber $R_2$ via the passage 24a of the spool member 24, then finally to the rear wheel brake cylinders 11, 11 via the outlet port 21b and the pipe line $P_2$. Thus, the front and rear wheel cylinders 11 and 12 are actuated to operate the brakes in response to the value of the master cylinder pressure Pm. In this stage, due to a difference in pressures acting on the smaller and larger ends of the differential piston 22, the piston 22 is moved in the rightward or rearward direction against the first and second compression springs 28 and 26 to increase the resilient force of the second spring 26.

When the master cylinder pressure Pm is increased to a value $Pm_1$ where the ball 23 is subjected to a deceleration in excess of a predetermined value (for instance, 0.3 G), the ball 23 starts to roll forwardly against the resilient force of the second spring 26 and moves into engagement with the valve seat 25 to cut-off the fluid communication between the first and second chambers $R_1$ and $R_2$. This operation stage is indicated by a point A in FIG. 2. If the master cylinder pressure Pm is further increased by continued application of the brake pedal 13, the differential piston 22 is moved in the leftward or forward direction in accordance with the increase of the pressure in the first chamber $R_1$ so that the wheel cylinder pressure Pw trapped in the second chamber $R_2$ is increased as indicated by a line segment A - B in FIG. 2. In this instance, the ball 23 is seated on the valve seat 25 due to its inertia and a difference in pressure between the first and second chambers $R_1$ and $R_2$.

When the master cylinder pressure Pm is increased to a high value $Pm_2$, the differential piston 22 is engaged at its stopper 22b with the inner wall of the left housing section 21B to restrict the forward movement of the piston 22. Thereafter, the wheel cylinder pressure Pw in the second chamber $R_2$ will no longer increase despite of further increase of the master cylinder pressure Pm. Thus, the wheel cylinder pressure Pw is maintained in a predetermined high value as indicated by a line segment B - C in FIG. 2.

In the case that the brake pedal 13 is depressed under a loaded condition of the vehicle, the rate of deceleration does not reach the predetermined value (0.3 G) even if the master cylinder pressure Pm is increased to the value $Pm_1$. As a result, the ball 23 does not roll forwardly and permits fluid flow from the first chamber $R_1$ to the second chamber $R_2$. Thus, the wheel cylinder pressure Pw is continuously increased in accordance with the increase of the master cylinder pressure Pm and simultaneously the differential piston 22 is further moved against the first and second springs 28 and 26 in the rightward or rearward direction to increase the resilient force of the second spring 26.

When the master cylinder pressure Pm is increased up to a value $Pm_3$ where the ball 23 is subjected to a deceleration in excess of a predetermined high value (for instance 0.6 G), the ball 23 starts to roll forwardly by the inertia moment against the resilient force of the second spring 26 and moves into engagement with the valve seat 25 to cut-off the fluid communication between the first and second chambers $R_1$ and $R_2$. This operation stage is indicated by a point a in FIG. 2. Furthermore, the remaining function of the valve unit 20 is substantially the same as in the case when the vehicle is under the unloaded condition and will apparently be recognized when referred to a line segment a - b - c in FIG. 2.

Figure 2:
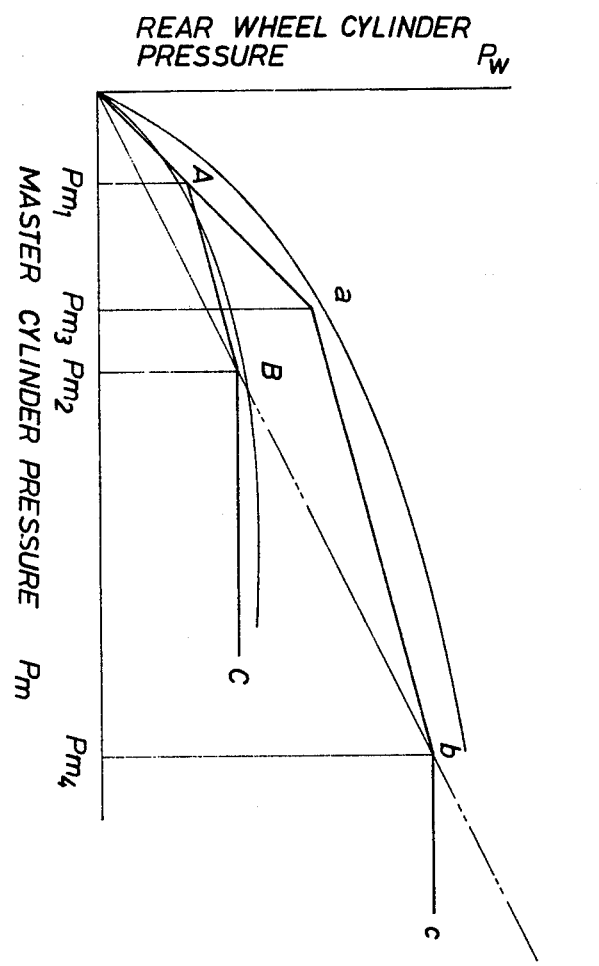
FIG. 2 is a graph showing the pressure controlling characteristics of the valve unit shown in FIG. 1.

Moreover, in the above embodiment, if the stopper 22b of the piston 22 is not provided, the piston 22 can be further moved in the leftward or forward direction after engagement of the retainer 27 against the inner shoulder of the recessed portion 21d so that the wheel cylinder pressure Pw trapped in the second chamber $R_2$ is further increased in accordance with the increase of the master cylinder pressure Pm as indicated by dot-dash lines in FIG. 2.

Figure 3:
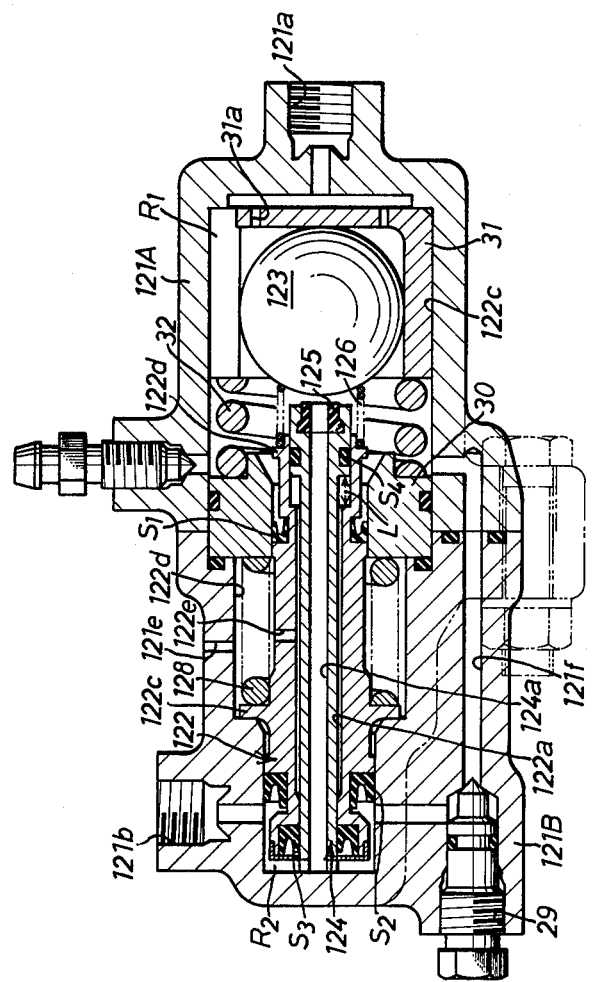
FIG. 3 is a sectional view of another embodiment of a valve unit according to the present invention.

In FIG. 3, there is illustrated another embodiment of the present invention wherein a stepped piston 122 and a stepped spool member 124 correspond with the differential piston 22 and the spool member 24 of the previous embodiment respectively. The stepped piston 122 has a large diameter portion slidable through a seal member $S_2$ within a counter bore of a left housing section 121B and a small diameter portion slidable through a seal member $S_1$ within an axial bore of a support member 30. Thus, the stepped piston 122 is exposed at the smaller end thereof in a first chamber $R_1$ and exposed at the larger end thereof in a second chamber $R_2$. The stepped piston 122 is provided at the outer periphery thereof with an annular flange 122c engageable with an inner shoulder of the left housing section 121B and provided at the smaller end thereof with an annular flange 122d to which one end of a spring 126 is engaged. The piston 122 is further provided therethrough with an axial stepped bore 122a opening to the first and second chambers $R_1$ and $R_2$. The stepped tubular spool 124 has a small diameter portion slidable through a seal member $S_3$ within the small diameter portion of the stepped bore 122a and a large diameter portion slidable through a seal member $S_4$ within the large diameter portion of the stepped bore 122a. In this embodiment, the stepped spool 124 is merely engaged at the smaller end thereof with the inner wall of the left housing section 121B in the second chamber $R_2$ and provided at the larger end thereof with a valve seat 125. Between a stepped portion of the stepped spool 124 and an inner shoulder of the piston 122, there is provided a stroke L to allow relative movements of the spool 124 and the piston 122. Within the first chamber $R_1$, a ball receiver 31 is assembled to receive an inertiacontrolled ball 123 thereon. This ball receiver 31 is provided with two orifices 31a to permit fluid flow from an inlet port 121a into the first chamber $R_1$. The support member 30 and the ball receiver 31 are fixedly assembled in their positions by means of a compressed coil spring 32, one end of which is engaged with the support member 30 and the other end with the ball receiver 31. Thus, the ball 123 is resiliently supported by the spring 126 on the receiver 31. In FIG. 3, vent holes 121e and 122e are provided on a portion of the housing 121B and a portion of the piston 122 and a passage 121f is provided to purge the air in the first and second chambers $R_1$ and $R_2$ externally. This passage 121f is closed by plug 29 threaded into the housing 121B. Furthermore, the remaining construction of this embodiment is substantially the same as the previous embodiment.

With this embodiment, when the master cylinder pressure Pm is applied to the first chamber $R_1$ through the inlet port 121a and the ball 123 is in the position to permit fluid flow from the first chamber $R_1$ to the second chamber $R_2$ through the valve seat 125 and the passage 124a, the stepped spool 124 is fixedly engaged with the inner wall of the housing 121B due to a difference in pressures acting on the smaller and larger ends of the spool 124. After the fluid communication between the first and second chambers $R_1$ and $R_2$ is blocked by the ball 123 seated on the valve seat 125, the stepped spool 124 is also fixedly engaged with the inner wall of the housing 121B because the pressure in the first chamber $R_1$ becomes larger than the pressure in the second chamber $R_2$. The remaining function of the valve unit is substantially the same as that of the previous embodiment.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. An inertia-controlled valve unit for incorporation in a vehicle braking system between a master cylinder and rear wheel brake cylinders, comprising:
    a housing provided with an inlet port for connection to said master cylinder, an outlet port for connection to said rear wheel brake cylinders, and a stepped bore in communication with said inlet and outlet ports respectively at the small and large diameter portions thereof;
    a differential piston slidably disposed within said stepped bore to provide first and second fluid chambers respectively in open communication with said inlet and outlet ports, said piston being provided with an axial bore therethrough and being exposed at the smaller end thereof in said first chamber and at the larger end thereof in said second chamber;
    a tubular spool slidably disposed within said axial bore of said piston and having one end fixedly engaged with the inner wall of said housing in said second chamber and the other end exposed in said first chamber, said spool including an axial passage permitting fluid flow between said first and second chambers; and
    a cut-off valve including a valve seat provided on the other end of said spool and an inertia-controlled ball located within said first chamber to co-operate with said valve seat and rolling toward said valve seat to cut-off fluid flow from said first chamber to said second chamber when said ball is subjected to a deceleration in excess of a predetermined value.

2. An inertia-controlled valve unit as claimed in claim 1, further comprising a first spring for biasing said piston axially in a direction toward said second chamber.

3. An inertia-controlled valve unit as claimed in claim 2, further comprising a second spring engaged at one end thereof with said ball and at the other end thereof with the smaller end of said differential piston to resiliently support said ball in the original position, the resilient force of said second spring being varied in accordance with the movement of said piston toward said first chamber.

4. An inertia-controlled valve unit as claimed in claim 1, wherein said axial bore of said differential piston is a stepped bore having a small diameter portion opening to said second chamber and a large diameter portion opening to said first chamber and wherein said ball is housed within the large diameter portion of said second-named stepped bore.

5. An inertia-controlled valve unit as claimed in claim 4, further comprising a spring engaged at one end thereof with said ball and at the other end thereof with an inner shoulder of said second-named stepped bore to resiliently support said ball in the original position, the resilient force of said spring being varied in accordance with the movement of said piston toward said first chamber.

6. An inertia-controlled valve unit as claimed in claim 4, wherein said tubular spool is fixed at one end thereof to the inner wall of said housing in said second chamber and exposed at the other end thereof in the large diameter portion of said second-named bore.

7. An inertia-controlled valve unit as claimed in claim 1, wherein said axial bore of said differential piston is a stepped bore having a small diameter portion opening to said second chamber and a large diameter portion opening to said first chamber and said tubular spool is a stepped tubular spool slidable within said second-named stepped bore of said piston and having a smaller end thereof engaged with the inner wall of said housing in said second chamber and a larger end thereof exposed in said first chamber.

8. An inertia-controlled valve unit as claimed in claim 7, further comprising a first spring for biasing said piston axially in a direction toward said second chamber and a second spring engaged at one end thereof with said ball and at the other end thereof with the smaller end of said piston to resiliently support said ball in the original position, the resilient force of said second spring being varied in accordance with the movement of said piston toward said first chamber.

9. An inertia-controlled valve unit as claimed in claim 7, wherein a receiver is provided within said first chamber to receive said ball thereon, said receiver including at least one orifice to permit fluid flow into said first chamber from said inlet port.

10. An inertia-controlled valve unit as claimed in claim 1, wherein said differential piston is provided at the larger end thereof with a stopper portion engageable with the inner wall of said housing in said second chamber to restrict the movement of said piston toward said second chamber.

11. An inertia-controlled valve unit as claimed in claim 1, wherein said differential piston comprises a flange engageable with an inner shoulder of said stepped bore of said housing to restrict the movement of said piston toward said second chamber.

* * * * *